Patented May 22, 1934

1,959,718

UNITED STATES PATENT OFFICE 1,959,718

MOLDING PREPARATION AND MOLDED ARTICLE

Carl A. Houck, Buffalo, and Frank J. Moore, North Tonawanda, N. Y.

No Drawing. Application August 3, 1931, Serial No. 554,946

8 Claims. (Cl. 106—22)

This invention relates to molding preparations and molded articles; and it comprises as a new composition a mixture of a fine ground hard copal of the nature of Congo gum with certain proportions of absorbent filling materials possessing capillary properties, such as wood flour, and with a volatile liquid non-solvent of said copal, said volatile liquid being usually alcohol or acetone or a mixture of the two, and the ratio of gum, wood flour and liquid being such as will permit ready removal of the liquid by drying; and it also comprises articles molded from said preparations, said articles comprising wood flour or other absorbent filling materials possessing capillary properties distributed in a matrix of a copal of the nature of Congo gum; all as more fully hereinafter set forth and as claimed.

Congo is a geographical name and various resins originating in the Congo district have been sold at one time or another as "Congo gum". But the material now on the market as "Congo gum" or "Congo copal" is a certain particular resin of which the constants are about as follows: color, yellow to yellowish brown; specific gravity, 1.059 to 1.080; acid number, 35 to 143 (varying with the sample); saponification number 66 to 176; more or less soluble in benzene, oil of turpentine, chloroform and ether; substantially insoluble in alcohol and acetone. It softens at about 90° C. and melts at 180° C. Quotations for this gum are regularly found in the trade journals.

The physical properties of the gum are such as to make it desirable as a material for making useful articles, but no ready way of molding or shaping it is known. In commerce it occurs in fragmentary form, graded as to color, size of pieces, etc. Dark colored gum is cheap. It is not practicable to make desirable shaped articles by simple hot pressing or by melting and casting. Plasticizing or softening with solvents, without use of a filler, as a preliminary to molding is also not practical because of the difficulty of removing the solvent afterwards.

In its properties as regards alcohol and acetone solubility, this particular gum is noteworthy. Immersed in either it becomes tacky and soft but does not dissolve. The gum swells and forms a plastic mass which is sufficiently coherent to be mechanically lifted from the excess of volatile liquid. The gum appears to take up or dissolve alcohol and acetone but is not itself dissolved in these liquids. Dyes dissolved in the solvent become distributed through the gum; a fact convenient in the present invention.

We have found that if a copal of the nature of this Congo gum in a finely ground state is mixed with approximately equal quantities of an absorbent filler having capillary properties such as wood flour, and with a small amount of volatile non-solvent liquids, such as alcohol or acetone, we can produce a convenient molding preparation from which molded sheets or articles can readily be produced. With this mixture in proper proportions, the ordinary difficulty of removing solvents disappears. In this molding preparation we use only enough alcohol or acetone, or a mixture of the two, to soften the gum somewhat. Upon molding the mixture of absorbent material and gum containing a little alcohol and exposing to evaporating conditions, the alcohol evaporates with the aid of the wood flour. The final dried article is composed of wood flour in a matrix of gum, all united into a hard aggregate.

There appears to be a specific cooperation or combination between the gum and the filling material. Only those absorbent materials which possess capillary properties are suitable in our process. This includes wood flour, wood fibre, sawdust, cotton fibres, linters and other like fibrous materials. The capillarity of these materials is apparently required to furnish a satisfactory method of eliminating the volatile liquids employed. They may be said to exert a sort of "wick action", absorbing the liquid from the softened resin fragments and by capillary action carrying it to the surface of the molded article so that it may be easily dissipated by evaporation. Upon evaporation of the non-solvent liquids the material sets or hardens and, with our molding powders, this setting occurs at room temperatures and within a relatively short period of time. Setting may, of course, be accelerated by heating.

If a non-capillary material is employed in our molding preparations or if too large proportions of gum are used, the setting of molded articles is imperfect and may take several days' time. The gum then appears to form a film on the outside of the articles. The outside may harden to some extent but the material remains soft on the inside. Hence it is important to employ absorbent fillers possessing capillary properties.

Another important function of the absorbent fillers possessing capillary properties is to distribute the volatile liquids uniformly throughout the composition. With other fillers the liquids invariably tend to separate or to segregate to some extent making a lumpy mass. When the distribution of the liquid is not uniform, molding becomes difficult or impossible. With our absorbent fillers, however, the distribution of liquid is so uniform that the molding powder does not usually require re-mixing even after standing for several days.

We consider the best proportions of our ingredients to range from about 40 to 60 parts by weight of gum to from 60 to 40 parts of absorbent fillers. While mixtures containing as low as 25 parts of gum to 75 parts of absorbent filler are operative, they form articles which are soft and are not water resistant. The tensile strength falls off rapidly with proportions of gum less than about 40 per cent. On the other hand, when the gum content is increased much above 60 per cent, drying becomes difficult. Mixtures containing above 75 parts of gum to 25 parts of filler are too slow in drying to be practical.

With the above proportions of gum and absorbent filler, there is used a volatile non-solvent liquid such as alcohol, acetone or xylene. Other volatile liquids in which the gum swells but in which it is substantially insoluble are also within the scope of our invention. The rapidity of the drying may be controlled by the type of non-solvent employed. Thus, acetone gives a very quick drying while alcohol is much slower. Mixtures of these non-solvents exhibit intermediate rates.

Two types of molding preparations can be employed, according to the amount of volatile non-solvent used in making the same. If from 20 to 50 per cent of non-solvent is employed the preparation is dough-like, while if from 5 to 15 per cent of non-solvent is used the preparation tends to become granular or sand-like in character. As to which of these two preparations is the more suitable in a given case depends to a large extent upon the pressures and temperatures to be employed in the molding step. The dough-like preparation is suitable for a cold molding operation with pressures ranging between 100 and 5000 pounds per square inch or more. We may employ approximately 25 per cent of non-solvent, based on the weight of the gum and filler.

In making the above described dough-like molding preparation it is sometimes desirable to incorporate from 5 to 15 per cent of water. We have found that such addition to the preparation produces a remarkable effect. It lightens the color, immediately stops stickiness and changes the rather stiff, almost putty-like material to a soft non-sticky mass with properties much better suited for molding. The addition of water has much the same effect upon the gum itself after it has been softened by non-solvent. The water changes the softened gum into a mass which can be easily worked with the fingers without sticking and which has elastic properties much like rubber.

If a smaller amount of non-solvent is employed, say from 5 to 15 per cent, a quite different type of molding preparation results. In this case the materials, upon mixing with non-solvent, remain granular and sand-like in character. The preparation flows readily; like sand. The proportion of solvent is so small that there is practically no shrinkage after molding and hence articles may be molded accurately to size. With this sand-like molding powder a considerably higher molding pressure is required. It is sometimes advantageous to employ hot molding. Pressures between 500 and 5000 pounds per square inch and molding temperatures between cold and 150° F. give satisfactory results.

Both the dough-like and the granular molding preparations can be sealed in tight containers and can be shipped or kept in storage for long periods of time without changing in properties. The sandy preparation may be left in the air for some time prior to molding without material damage from loss of solvent. This is apparently due to the fact that the solvent becomes absorbed or trapped by the gum and evaporates, as stated, only with difficulty.

Various additions may be made to the above described molding preparations. These include pigments and dyes as well as other gums and resins. Plasticizers may be added to reduce the brittleness, also materials for waterproofing. For example if a small proportion of petrolatum is incorporated in the articles, the waterproofness is greatly improved. Drying oils such as linseed and China-wood oil act as plasticizers. The brittleness of the product is greatly reduced by the presence of a few per cent of such oils. Rubber introduced in the form of a solution, for example as latex, is likewise a desirable plasticizer. For cedar chest work naphthalene or cedar oil may be added.

In shaping or forming the desired articles, various procedures may be followed. The molding composition may be cold molded in suitable molds using pressure alone. Or the dough-like composition may be rolled into sheets which remain temporarily flexible like leather and the sheets may be glued or united to the surface of any suitable article forming a sort of veneer. The sheets thus produced may be used for stamping out any suitable blanks which may be directly hardened or which may be given a final detailed impression before hardening. Embossed and decorated surfaces may be advantageously obtained in this manner; a pattern or design being impressed in the surface of the composition. Upon hardening, this design or pattern is faithfully retained. Again the dough-like composition may be extruded with any of the usual extrusion apparatus. In this way bars, rods, or other shaped continuous stock may be produced. Such shaped bar or flat stock after hardening may be cut by machine to give various products. Also such extruded material may be used as reformed rough blanks, while still in the plastic state, for charging into suitable molds and eventually given a final shaping or detail desgn in suitable molds under pressure with heat if desired, as it softens if the temperature is high enough. After the material has lost its solvent it can still be made plastic with heat and reshaped under pressure. It can also be used without extruding in the bulk form.

The granular molding powder produced with a minimum of non-solvent, as described above, produces molded articles which are substantially non-flexible. As soon as the articles are pressed they are ready for use, although some solvent will come off for awhile. The elimination of the time required for hardening is important. Various articles such as chessmen, checkers, children's play blocks, decorative moldings, picture frames and all other articles commonly made from wood, papier-mâché and the like may be produced.

The finished articles, as produced from either of our molding preparations, have much the general appearance and properties of hardwood. The finished material can be turned in a lathe, cut with a saw and worked in many ways. It may also be finished like wood, by staining and varnishing or by painting or lacquering. In the finished articles of our invention the matrix of Congo gum is unfluxed, that is, no melting of the gum has taken place during molding or drying or subsequent to mixing with filler. This clearly distinguishes our products from those produced by hot molding, for example.

In a specific example of our process, we took 100 pounds of powdered Congo gum, 100 pounds of wood flour and 50 pounds of denatured alcohol. This mixture was added to a dough mixing machine. At first the mixture was quite granular but after the mixing became substantially complete (about 15 minutes) a dough-like or putty-like mass was obtained. Some of this material was then taken and molded into the form of pilasters for a piano under a pressure of 100 pounds. After molding, the pilasters were still flexible. They were then heated for 3 hours in an oven at 160° F. After this treatment the pilasters were stained and varnished. The finished articles had all the appearance of wood. The impression from the mold was so sharp that it was difficult to observe any difference between the molded articles and hand carved pilasters. The molded pilasters were then drilled and fastened to a piano with ordinary wood screws.

What we claim is:

1. A molding preparation comprising the following ingredients in about the proportions by weight of, a copal of the nature of Congo gum 40 to 60 parts, an absorbent filler possessing capillary properties 60 to 40 parts, and sufficient of a volatile non-solvent to produce a dough-like consistency; the said Congo gum being a resin softening at about 90° C. and melting at about 180° C., having a color of yellow to yellowish-brown, a specific gravity of 1.059 to 1.080, an acid number of 35 to 143, a saponification number of 66 to 176 and being more or less soluble in benzene, oil of turpentine, chloroform and ether but being substantially insoluble in alcohol and acetone.

2. The molding preparation of claim 1 wherein the absorbent filler is selected from a class consisting of wood flour, sawdust and cotton.

3. The molding preparation of claim 1 wherein the absorbent filler is wood flour.

4. The molding preparation of claim 1 wherein the volatile non-solvent is alcohol employed in proportions ranging from about 5 to 30 per cent by weight.

5. A molding preparation comprising the following ingredients in about the proportions by weight of, a copal of the nature of Congo gum 40 to 60 parts, wood flour 60 to 40 parts, from 5 to 50 parts of alcohol and from 5 to 15 per cent of water; the said Congo gum being a resin softening at about 90° C. and melting at about 180° C., having a color of yellow to yellowish-brown, a specific gravity of 1.059 to 1.080, an acid number of 35 to 143, a saponification number of 66 to 176 and being more or less soluble in benzene, oil of turpentine, chloroform and ether but being substantially insoluble in alcohol and acetone.

6. As a new article of manufacture, a cold molded article comprising an absorbent filler possessing capillary properties distributed through an unfluxed matrix of a copal of the nature of Congo gum, the absorbent filler and the Congo gum being in the proportions of 40 to 60 parts filler, to from 60 to 40 parts Congo gum; the said Congo gum being a resin softening at about 90° C. and melting at about 180° C., having a color of yellow to yellowish-brown, a specific gravity of 1.059 to 1.080, an acid number of 35 to 143, a saponification number of 66 to 176 and being more or less soluble in benzene, oil of turpentine, chloroform and ether but being substantially insoluble in alcohol and acetone.

7. The article of claim 6 wherein the absorbent filler is wood flour.

8. As a new article of manufacture, a cold-molded article comprising wood flour distributed through an unfluxed matrix of a copal of the nature of Congo gum and of a small amount of dried linseed oil, the wood flour and the Congo gum being in the proportions of from about 40 to 60 parts filler to from 60 to 40 parts Congo gum; the said Congo gum being a resin softening at about 90° C. and melting at about 180° C., having a color of yellow to yellowish-brown, a specific gravity of 1.059 to 1,080, an acid number of 35 to 143, a saponification number of 66 to 176 and being more or less soluble in benzene, oil of turpentine, chloroform and ether, but being substantially insoluble in alcohol and acetone.

CARL A. HOUCK.
FRANK J. MOORE.